UNITED STATES PATENT OFFICE.

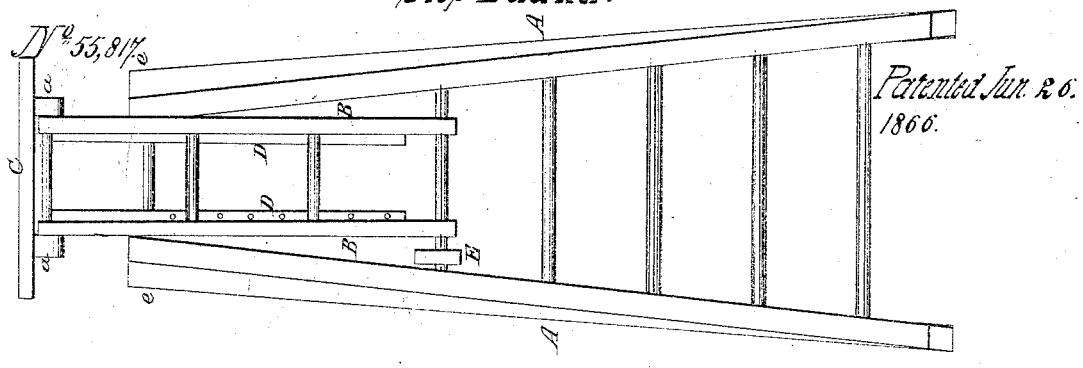
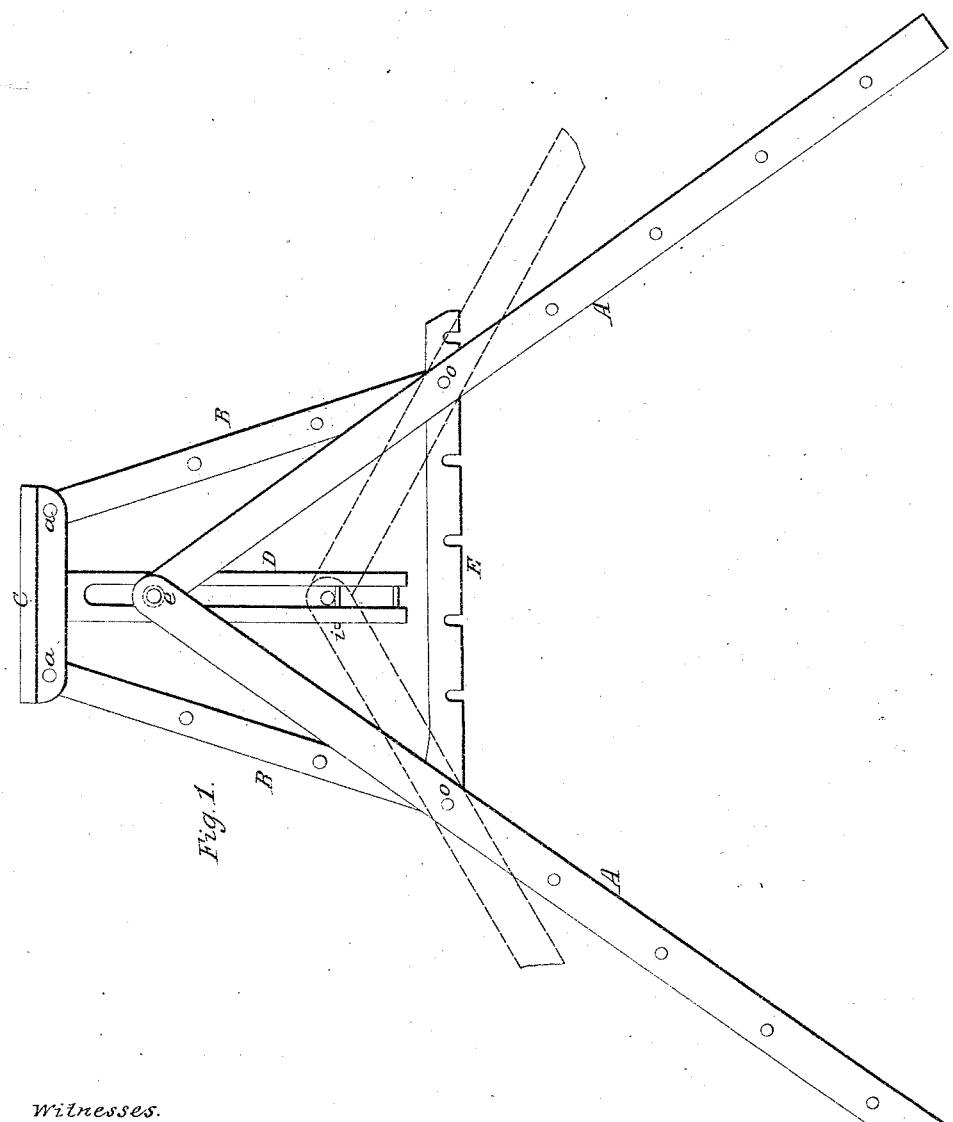

E. P. H. CAPRON, OF SPRINGFIELD, OHIO.

IMPROVED STEP-LADDER.

Specification forming part of Letters Patent No. 55,817, dated June 26, 1866.

*To all whom it may concern:*

Be it known that I, E. P. H. CAPRON, of Springfield, in the county of Clarke and State of Ohio, have invented certain new and useful Improvements in Fruit-Ladders; and I do hereby declare that the following is a full, clear, and exact description thereof, reference being had to the accompanying drawings, making part of this specifiaation, and to the letters of reference marked thereon, like letters indicating like parts wherever they occur.

To enable others skilled in the art to construct and use the invention, I will proceed to describe it.

My invention consists in a platform attached to the top of two ladders pivoted at their upper end, in combination with devices for adjusting it at various heights, as may be required.

Figure 1 is a side view, and Fig. 2 a front view of the same.

I first take two ladders of the ordinary construction and pivot them together by means of the rod *e*, as shown. These ladders A have no rounds at their upper portion, as shown.

C represents a platform having attached to it one or two vertical slatted bars, D, which are so located as to embrace in its slot the rod *e*, as shown in Fig. 1.

If but one bar D be used, it may be placed at the center of the platform C; but if two are used they will be secured at the sides, as shown in Fig. 2.

B represents a short ladder, one on each side, having its upper end pivoted to the platform at *a*, while its lower end is pivoted upon the upper round, *o*, of the ladder A. These short ladders B thus serve the double purpose of supporting the platform C and also of mounting upon it the bar D, serving to prevent the platform from moving laterally or tipping.

E represents a notched bar secured at one end to the round *o* of one of the ladders A and having one of its notches engaged with the round *o* of the opposite ladder, and thus holding the two main ladders A from spreading, and consequently keeping the platform C from descending.

The slotted bar D is provided with a series of holes, as shown in Fig. 2, and a bolt, *i*, is fitted therein, so that when the ladders are spread so far asunder that the bar E will not reach across and lock them together the rod *e* will rest upon the pin *i*, and thus prevent them from spreading.

By these means I construct a ladder that is strong, convenient, and safe, and that can be adjusted at any desired height and securely locked in position, thereby preventing accidents, which so frequently occur from the slipping of the ladders in general use.

Having thus described my invention, what I claim is—

1. The ladders A and B, platform C, and the notched bar E, all combined and arranged to operate as shown and described.

2. The slotted bar D, provided with the series of holes, and pin *i*, arranged to operate in combination with the ladders A and B and platform C, as herein set forth.

E. P. H. CAPRON.

Witnesses:
W. C. DODGE,
P. T. DODGE.